United States Patent [19]

Hergenrother et al.

[11] Patent Number: 5,212,276
[45] Date of Patent: May 18, 1993

[54] POLYIMIDES WITH IMPROVED COMPRESSION MOLDABILITY

[75] Inventors: Paul M. Hergenrother, Yorktown; Stephen J. Havens, Newport News, both of Va.; Mark W. Beltz, Baton Rouge, La.

[73] Assignee: The United States of America as represented by the Administrator of the National Aeronautics and Space Administration, Washington, D.C.

[21] Appl. No.: 520,472

[22] Filed: May 8, 1990

[51] Int. Cl.$^5$ ............ C08G 8/02; C08G 73/10; C08G 69/26
[52] U.S. Cl. .................... 528/125; 528/128; 528/170; 528/172; 528/173; 528/176; 528/183; 528/185; 528/188; 528/220; 528/229; 528/350; 528/351; 528/353; 428/473.5
[58] Field of Search .............. 428/473.5; 528/125, 528/128, 173, 172, 185, 170, 220, 229, 176, 183, 188, 350, 351, 353

[56] References Cited

U.S. PATENT DOCUMENTS 4,713,438 12/1987 Harris et al. .................... 528/125
4,820,791 4/1989 Hergenrother et al. .......... 528/125

OTHER PUBLICATIONS

CA: 107: 7716z, Hergenrother, et al.
CA: 109: 150528m, Hergenrother, et al.
CA: 111: 39986m, Hergenrother, et al.
"Polyimides Containing Carbonyl & Ether Connecting Groups II," (1989) Journ. Poly. Sci.: Part A: Polym. Chem., vol. 27, pp. 1161–1174, Hergenrother, et al.
"Polyimides Containing Carbonyl & Ether Connecting Groups", Hergenrother, et al., Journ. Poly. Sci.: Part A: Poly. Chem., vol. 25, (1987) pp. 1093–1103.

Primary Examiner—John Kight, III
Assistant Examiner—P. Hampton-Hightower
Attorney, Agent, or Firm—George F. Helfrich

[57] ABSTRACT

The semicrystalline polyimide prepared by reaction of 3,3',4,4'-benzophenonetetracarboxylic dianhydride (BTDA) and 1,3-bis(4-aminophenoxy-4'-benzoyl)benzene (1,3-BABB) is modified so that it can be more readily processed to form adhesive bonds, moldings and composites. The stoichiometric ratio of the two monomers, BTDA and 1,3-BABB is controlled so that the intermediate polyamide acid is of a calculated molecular weight. A polyamide acid with excess anhydride groups is then reacted with the stoichiometrically required amount of monofunctional aromatic or aliphatic amine required for complete endcapping. A polyamide acid with excess amino groups is reacted with the stoichiometrically required amount of monofunctional aromatic anhydride required for complete endcapping. The stoichiometrically offset, endcapped polyimide is processed at lower temperatures and pressures than the unmodified high molecular weight polyimide with the same repeat unit, and exhibits an improved melt stability.

10 Claims, No Drawings

POLYIMIDES WITH IMPROVED COMPRESSION MOLDABILITY

ORIGIN OF THE INVENTION

The invention described herein was jointly made by an employee of the United States Government, a student, and in the performance of work under a NASA Contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

This invention relates generally to polyimides. It relates particularly to modifications of the polyimide formed by reaction of 3,3′,4,4′-benzophenonetetracarboxylic dianhydride and 1,3-bis(4-aminophenoxy-4′-benzoyl)benzene, whereby the resulting compositions are easily compression molded.

2. Description of the Related Art

The semicrystalline polyimide formed by reaction of 3,3′,4,4′-benzophenonetetracarboxylic dianhydride (BTDA) and 1,3-bis(4-aminophenoxy-4′-benzoyl)benzene (1,3-BABB) has been demonstrated to possess excellent film properties in its high molecular weight form (P. M. Hergenrother and S. J. Havens, U.S. Pat. No. 4,820,791; and P. M. Hergenrother, N. T. Wakelyn, and S. J. Havens, *J. Polym. Sci.; Part A: Polym. Chem.*, 25, 1093 (1987)). These properties include high tensile strength and modulus and excellent resistance to chemicals. However, efforts to fabricate this high molecular weight polyimide into composite or adhesive panels require the use of high temperatures and high pressure, which conditions are needed for polymer consolidation. For example, a bonding temperature of 400° C. at a pressure of 1000 psi was required to bond titanium to titanium tensile shear specimens. This bonding pressure is in excess of that which can be applied in many commercial processes.

SUMMARY OF THE INVENTION

Our approach to reducing molding conditions by increasing melt flow involves reducing molecular weight and narrowing molecular weight distribution. Molecular weight is reduced in a predictable manner by offsetting monomer stoichiometry according to the Carothers equations.

$$\overline{M_n} = \left(\frac{786.7}{2}\right)\frac{1+r}{1+r-2rp}$$

$\overline{M_n}$ is the number average molecular weight, 786.7 is the molecular weight of the repeat unit of the polyimide, r is the molar ratio of monomers, and p is the extent of the reaction (considered to be one). It is accordingly possible to use an excess of either monomer to reduce molecular weight of the polymer produced. In either case, however, reactive endgroups are present, which lead to undesirable reactions, for example, chain degradation, chain extension, or branching. To avoid this, we endcap these reactive functionalities to form nonreactive endgroups, which render the reduced molecular weight polyimide more thermally stable. For example, when excess BTDA is used, the terminal anhydride groups can be reacted with primary amines. When excess 1,3-BABB is used, the terminal amino groups can be reacted with an aromatic ortho-anhydride.

This invention is accordingly a process whereby the semicrystalline polyimide prepared by reaction of 3,3′,4,4′-benzophenonetetracarboxylic dianhydride (BTDA) and 1,3-bis(4-aminophenoxy-4′-benzoyl)benzene (1,3-BABB) is modified so that it is more readily processed to form adhesive bonds, moldings and composites. By this process the stoichiometric ratio of the two monomers, BTDA and 1,3-BABB is controlled so that the intermediate polyamide acid is of a calculated molecular weight. A polyamide acid with excess anhydride groups is then reacted with the stoichiometrically required amount of monofunctional aromatic or aliphatic amine required for complete endcapping. A polyamide acid with excess amino groups is reacted with the stoichiometrically required amount of monofunctional aromatic anhydride required for complete endcapping. The resulting polyamide acid solution is used to impregnate glass or carbon fiber reinforcement, and dried to remove solvent and to convert the polyamide acid to the polyimide. Alternately, the polyamide acid is either thermally or chemically converted to the polyimide. The resulting solid is used to make moldings, or as finely divided particles, is used to impregnate glass or carbon fiber reinforcement. Regardless of imidization method, the stoichiometrically offset, endcapped polyimide is processed at lower temperatures and at considerably lower pressures than the unmodified high molecular polyimide with the same repeat unit. In addition, endcapping provides a polyimide exhibiting improved melt stability.

DESCRIPTION OF THE PREFERRED EMBODIMENTS

The molar ratio of 3,3′,4,4′-benzophenonetetracarboxylic dianhydride (BTDA) to 1,3-bis(4-aminophenoxy-4′-benzoyl)benzene (1,3-BABB) is varied from 1.005 to 1.10 and from 0.90 to 0.995.

A. Polyimide Composition in Which Excess BTDA is Used

The general reaction sequence for the synthesis of a stoichiometrically offset, endcapped polyimide is represented by the following general equations.

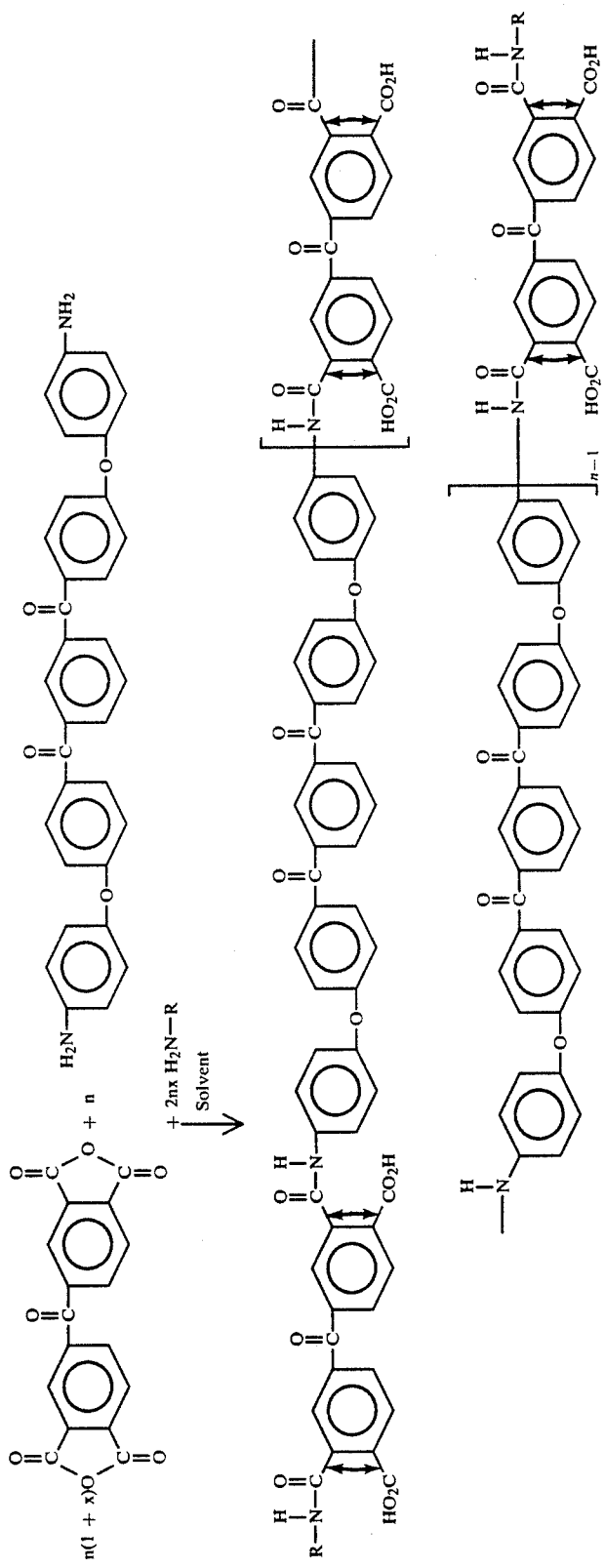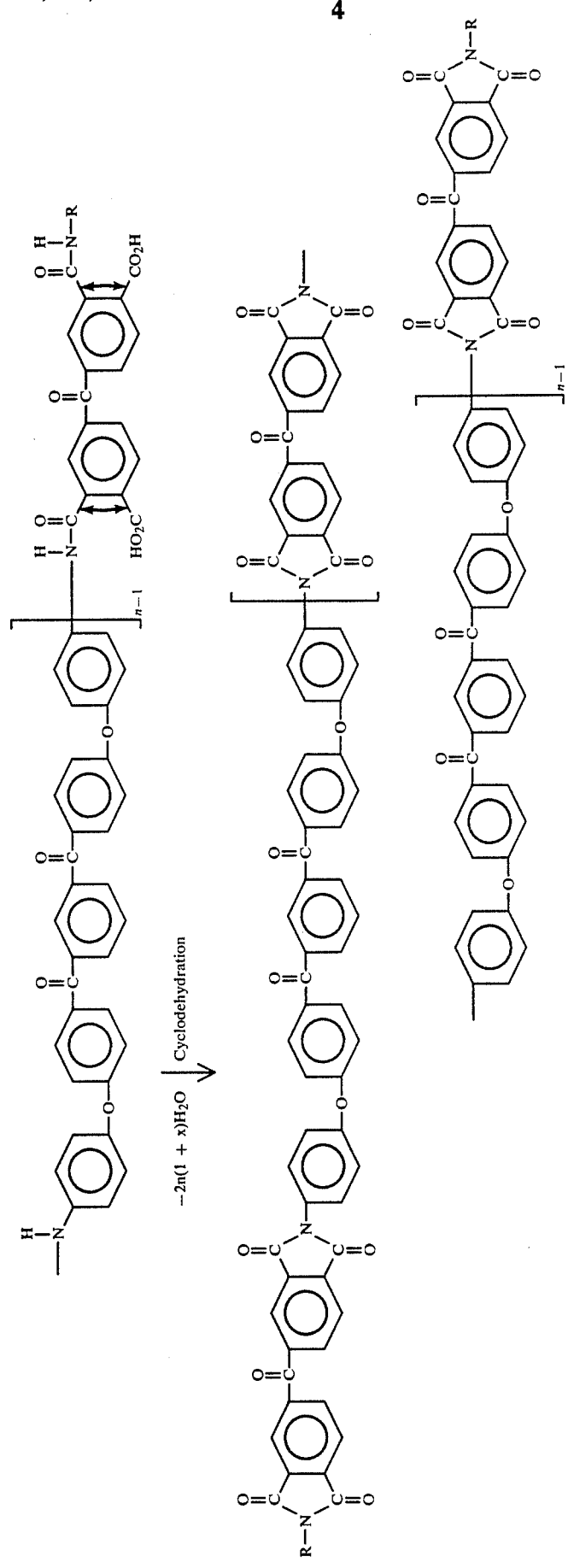

The molar ratio is determined by x, which can vary from 0.005 to 0.10. Therefore n varies from 200 to 10. Use of the endcapping agent $RNH_2$, improves the melt stability of the polyimide. R is selected from a group of aliphatic and aromatic radicals consisting of:

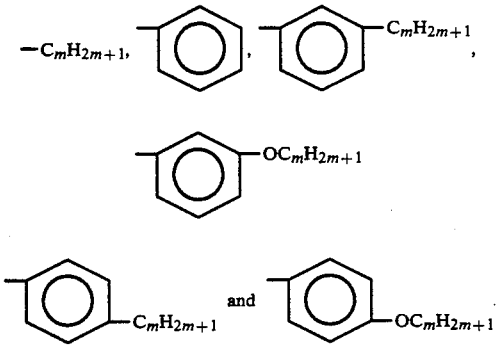

where m is an integer from 1 to 10 and the aliphatic groups may be variety of structural isomers. The solvent is N,N-dimethylacetamide, N,N-dimethylformamide, dimethylsulfoxide, N-methyl-2-pyrrolidinone, m, cresol, or ether solvents such as diglyme. Cyclodehydration is accomplished chemically by reaction of the polyamide acid with a dehydrating agent such as acetic anhydride, or thermally by heating the polyamide acid either in solution or neat at temperatures exceeding 150° C.

The half esters and esters of 3,3',4,4'-benzophenonetetracarboxylic acid may be used instead of BTDA in the synthesis of the stoichiometrically offset, endcapped polyimide. The compounds have the following structures:

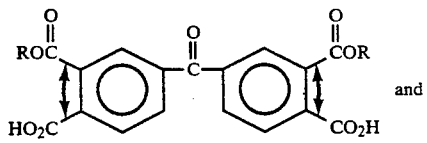 and 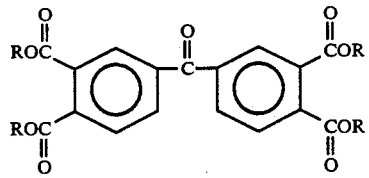

where R is as previously described.

Table 1 lists the inherent viscosities ($\eta_{inh}$) of the intermediate polyamide acids and the glass transition temperatures ($T_g$) and polymer melt temperatures ($T_m$) of the previously described polyimides (PI) in which the stoichiometry has been offset 2.5 to 7.5 percent in favor of BTDA and the excess anhydride groups have been endcapped with various amines.

TABLE 1

Stoichiometrically offset Amine Endcapped Polyimides

| R | Stoichiometric Offset, % | Mole % Amine | Poly(amide Acid) $\eta_{inh}$, dL/g | Polyimide $T_g$ °C. | Polyimide $T_m$ °C. |
|---|---|---|---|---|---|
| — | 0 | 0 | 0.81 | 222 | 350 |
| $H_{13}C_6$— | 2.5 | 5 | 0.93 | 222 | 355 |
|  | 5 | 10 | 0.68 | 218 | 355 |
| (phenyl) | 2.5 | 5 | 0.67 | 222 | 365 |
|  | 5 | 10 | 0.44 | 218 | 370 |
|  | 7.5 | 15 | 0.34 | 215 | 374 |
| $H_{13}C_6$—(phenyl)— | 2.5 | 5 | 0.65 | 219 | 354 |
|  | 5 | 10 | 0.50 | 217 | 360 |

B. Polyimide Composition in Which Excess 1,3-BABB is Used

The general reaction sequence for the synthesis of a stoichiometrically offset, endcapped polyimide is represented by the following general equation:

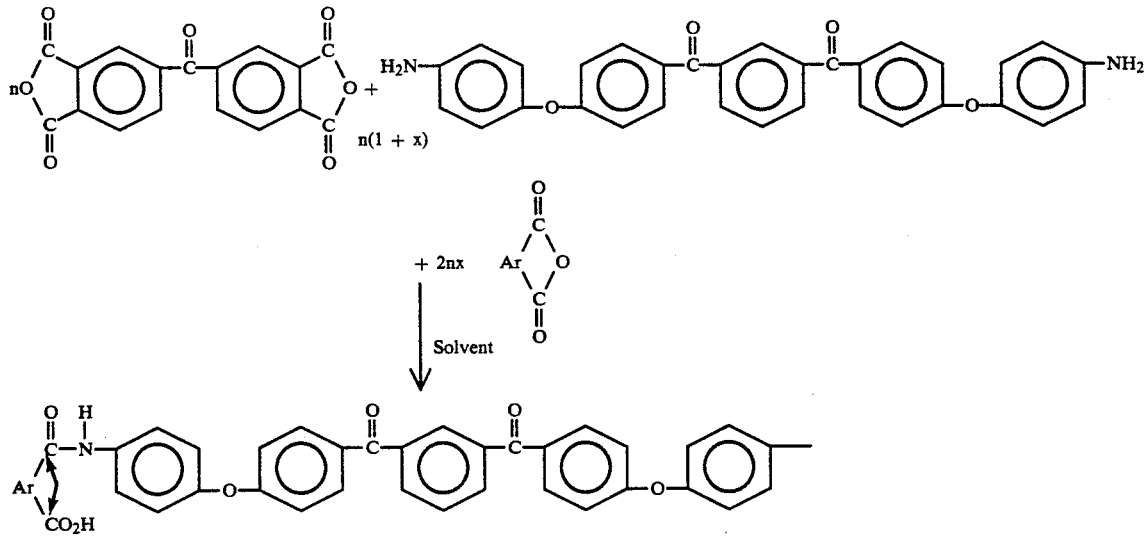

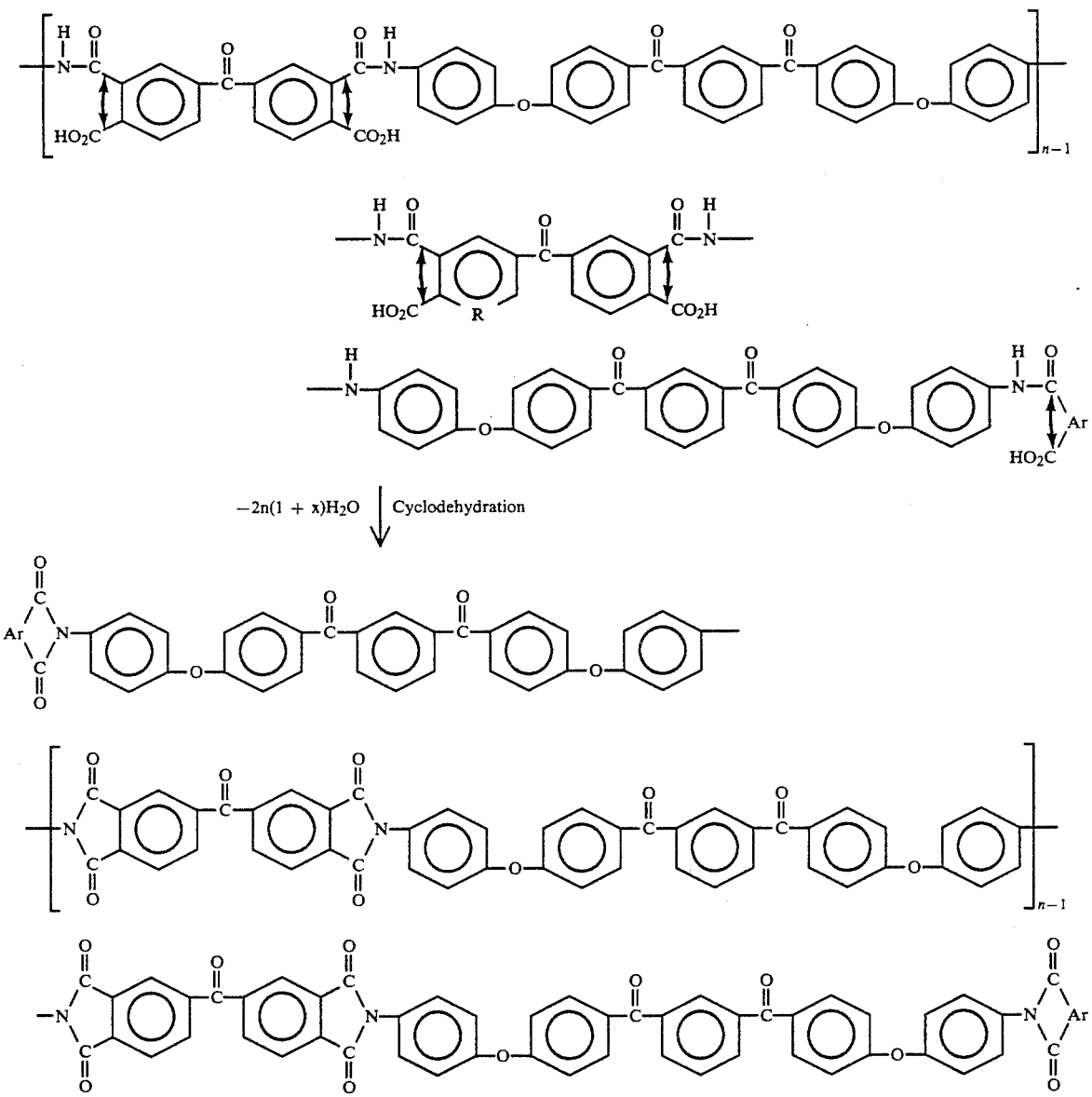

The values of x and n are as previously described; and, the solvent and cyclodehydration process are as previously described. The use of the endcapping agent

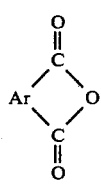

improves the melt and thermooxidative stability of the polyimide. Ar is a divalent aromatic radical selected from:

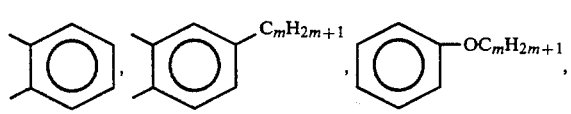

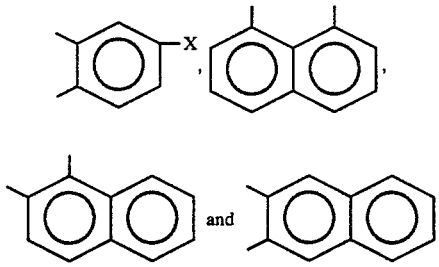

where X=Br, Cl, NO₂, phenyl, phenoxy, benzoyl, and phenylsulfonyl, and where m is as previously described.

The half esters and esters of 3,3′,4,4′-benzophenonetetracarboxylic acid as described in Part A may be used instead of BTDA in the synthesis of the stoichiometrically offset endcapped polyimide. The half esters and esters of the aromatic 1,2-dicarboxylic acid may be used instead of the aromatic anhydride. These compounds have the following structures:

$$\begin{array}{c}\text{Ar}\begin{array}{c}\diagup\text{COR}\\ \diagdown\text{COH}\\ \phantom{\diagdown}\|\\ \phantom{\diagdown}\text{O}\end{array}\end{array}\quad\text{and}\quad\begin{array}{c}\text{Ar}\begin{array}{c}\diagup\text{COR}\\ \diagdown\text{COR}\\ \phantom{\diagdown}\|\\ \phantom{\diagdown}\text{O}\end{array}\end{array}$$

where Ar and R are as previously described.

Table 2 lists the inherent viscosities of the intermediate polyamide acids and the glass transition temperatures and polymer melt transitions of the polyimides in which the stoichiometry has been offset 2.5 to 10 percent in favor of 1,3-BABB and the excess amino groups have been endcapped with various anhydrides. The weight losses of the stoichiometrically offset, endcapped polyimides in air at 300° C. are given in Table 3.

TABLE 2

Stoichiometrically Offset Anhydride Endcapped Polyimides

| Ar | Stoichiometric Offset, % | Mole % Anhydride | Poly(Amide Acid) $\eta_{inh}$, dL/g | Polyimide $T_g$, °C. | Polyimide $T_m$, °C. |
|---|---|---|---|---|---|
| — | 0 | 0 | 0.81 | 222 | 350 |
| 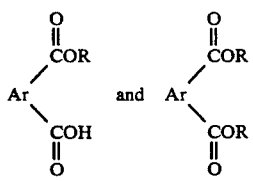 | 2.5 | 5 | 0.70 | 222 | 351 |
| | 5 | 10 | 0.55 | 218 | 354 |
| | 7 | 14 | 0.61 | 217 | 348 |
| | 9 | 18 | 0.49 | 212 | 348 |
| | 10 | 20 | 0.53 | 210 | 349 |
| naphthalene | 2.5 | 5 | 0.77 | 217 | 352 |
| | 5 | 10 | 0.50 | 229 | 349 |

TABLE 3

Weight Loss of Stoichiometrically Offset, Endcapped Polyimides at 300° C. in Air

| Endcap (5 Mole %) | Weight Loss after Hours, % | | | |
|---|---|---|---|---|
| | 48 | 144 | 244 | 500 |
| NONE | 0.6 | 2.0 | 2.4* | 5.9 |
| H₁₃C₆— | 2.0 | 3.4* | 5.9 | 13.7 |
| phenyl | 0.3 | 1.3* | 2.2 | 6.9 |
| H₁₃C₆-phenyl | 0.9 | 1.7 | 1.7 | 9.0 |
| phenyl | 0.6 | 1.5* | 2.1 | 6.9 |

TABLE 3-continued

Weight Loss of Stoichiometrically Offset, Endcapped Polyimides at 300° C. in Air

| Endcap (5 Mole %) | Weight Loss after Hours, % | | | |
|---|---|---|---|---|
| | 48 | 144 | 244 | 500 |
| naphthalene | 0.1 | 0.6 | 1.2* | 5.4 |

*Brittle and Darker

SPECIFIC EXAMPLES

EXAMPLE 1

5% Stoichiometrically Offset, 10% Phthalic Anhydride Encapped Polyimide 3,3',4,4'-Benzophenonetetracarboxylic dianhydride (BTDA) (61.38 g, 0.1905 mole) was added at once to a mechanically stirred solution of 1,3-bis(4-aminophenoxy-4'-benzoyl)benzene (1,3-BABB) (100.11 g, 0.200 mole) dissolved in 350 mL of bis(2-methoxyethyl)ether (diglyme) and 117 mL of N,N-dimethylacetamide (DMAc) at ambient temperature under a nitrogen atmosphere. After 24 hours, phthalic anhydride (2.81 g, 0.0190 mole) was added, and the viscous solution stirred an additional 20 hours at ambient temperature. At 19° C. the Brookfield viscosity of the 25% (w/w) solution was determined to be 8980 cP. The inherent viscosity determined at a concentration of 0.5 g/dL in DMAc at 25° C. was 0.57 dL/g. A film was cast from the polyamide acid solution and dried at a maximum temperature of 300° C. in air for one hour. The glass transition temperature ($T_g$) was determined by differential scanning calorimetry (DSC) to be 217° C., and the polymer melt transition ($T_m$) was determined to be 351° C.

Adhesive tape was prepared by multiple brush coating of the polyamide acid solution onto 112-A1100 E glass and drying the tape to a maximum temperature of 200° C. This tape was then used to bond primed Pasa-Jell 107 treated titanium (Ti, 6 Al, 4V) tensile shear specimens. The specimens were bonded at 375° C. under 200 psi for a period of 15 minutes. Lap shear strengths of 5650, 3860, and 2430 psi were obtained at 25, 177, and 200° C., respectively. Specimens annealed at 300° C. for 18 hours gave lap shear strengths of 5380, 4560, 3880, and 1070 psi at 25, 177, 200, and 232° C., respectively. Failures where predominantly cohesive, and good melt flow of the polyimide adhesive was evident.

Carbon fiber prepreg was prepared from the 25% (w/w) polyamide acid solution and unsized AS-4 carbon fiber. The prepreg was dried at 200° C. for one hour. Resin content was approximately 36% (w/w) and volatile content was 2.1%. Unidirectional 16-ply composites were fabricated at 365° C. under 500 psi for 30 minutes, then annealed at 300° C. under 500 psi for three hours. Ultrasonic testing indicated that the panels were well consolidated. Flexural strengths of 267, 212, 196, and 110 Ksi; and, flexural moduli of 15.0, 14.4, 14.4, and 11.9 Msi were obtained at 25, 177, 204 and 232° C., respectively. After aging unrestrained at 316° C. for 100 hours in air, flexural strengths were determined to be 265, 226, 214, and 209 Ksi, and flexural moduli were 14.3, 14.1, 14.0, and 13.3 Msi at 25, 177, 204, and 232° C., respectively.

EXAMPLE 2

10% Stoichiometrically Offset, 20% Phthalic Anhydride Endcapped Polyimide

BTDA (58.58 g, 0.1818 mole) was added all at once to mechanically stirred solution of 1,3-BABB (100.11 g, 0.200 mole) dissolved in 409 mL of DMAc at ambient temperature. After the solution was stirred overnight (about 21 hours) under a nitrogen atmosphere at ambient temperature, phthalic anhydride (5.39 g, 0.0364 mole) was added and the solution was stirred for an additional four hours at ambient temperature. The inherent viscosity measured at 0.5% concentration in DMAc at 25° C. was 0.53 dL/g. The Brookfield viscosity of the 30% (w/w) solution was 4200 cP at 25° C.

Films were cast from the polyamide acid solution and dried to a maximum temperature of 300° C. for one hour in air. The $T_g$ was 210° C., and the $T_m$ was 349° C. Reheating the quenched sample produced a large crystallization exotherm at 281° C. The brittle films were then ground to a fine powder. Approximately 10 g of the powder was molded in a 1.25×1.25 inch stainless steel mold at 375° C. under 500 psi to give a well consolidated molding.

EXAMPLE 3

10% Stoichiometrically Offset, 20% Phthalic Anhydride Endcapped Polyimide by Chemical Imidization The 30% (w/w) polyamide acid solution of Example 2 (65.85 g solution, 19.75 g solid) was diluted by the addition of 40 mL of DMAc. Over a five minute period a solution of triethylamine (7.24 mL, 0.052 mole) and acetic anhydride (22.8 mL, 0.242 mole) in 65 mL of DMAc was added to the mechanically stirred polyamide acid solution at ambient temperature under a nitrogen atmosphere. After 30 minutes a yellow solid precipitated. One hour after addition the stirred mixture was heated for three hours at 100°–120° C. The reaction mixture was allowed to cool, then added to 300–400 mL of methanol. The fine solid was collected by filtration, washed with methanol, and dried at 200° C. for one hour to yield 19.05 g yellow powder. The $T_g$ of the solid was 205° C., and the $T_m$ was 348° C. A sharp crystallization exotherm was observed at 267° C. on the initial DSC run. Using a parallel plate rheometer, the melt viscosity of this material at 375° C. ranged between 10,000 to 2,000 poise over an angular frequency range of 1 to 100 rad/sec.

EXAMPLE 4

10% Stoichiometrically Offset, 20% Phthalic Anhydride Endcapped Polyimide by Thermal Imidization in Solution BTDA (11.7195 g, 0.03637 mole) was added all at once to a stirred suspension of 1,3-BABB (20.0220 g, 0.0400 mole) in 105 mL of diglyme at ambient temperature. The solids dissolved after stirring three to four hours to form a yellow solution. Approximately 22 hours after the reaction was initiated, phthalic anhydride (1.0754 g, 0.00726 mole) was added and the solution stirred for an additional four hours. The inherent viscosity at 0.5% concentration in DMAc at 25° C. was 0.36 dL/g, and the Brookfield viscosity of the 25% (w/w) diglyme solution was 1200 cP at 27° C. Approximately 30 g of the solution was diluted with 80 mL of N-methyl-2-pyrrolidinone (NMP) and 20 mL of N-cyclohexyl-2-pyrrolidinone (CHP). The resulting solution was stirred at approximately 190° C. for 24 hours under a nitrogen purge. Solid precipitated after one to two hours. The mixture was allowed to cool, then added to 200–300 mL of methanol, washed with methanol, and dried at 250° C. for one hour to yield 7.1 g yellow solid. The $T_g$ of the solid was 211° C., and the $T_m$ was 365° C.

EXAMPLE 5

2.5% Stoichiometrically Offset, 5% Aniline Endcapped Polyimide

BTDA (100.00 g, 0.3104 mole) was added all at once to a mechanically stirred solution of 1,3-BABB (151.46 g, 0.03026 mole) and aniline (1.42 mL, 0.0155 mole) dissolved in 768 mL of DMAc at ambient temperature under a nitrogen atmosphere. The solution was stirred overnight at ambiebt temperature. The inherent viscosity measured at 0.48% concentration in DMAc at 25° C. was 0.69 dl/g. The Brookfield viscosity of the 26% (w/w) solution was 3835 cP at 24° C.

A film cast from the polyamide acid solution and dried at 300° C. in air for one hour was tough and flexible. The $T_g$ was 224° C. and the $T_m$ was 362° C.

What is claimed as new and desired to be secured by Letters Patent of the United States is:

1. The polyimide composition having the general structural formula:

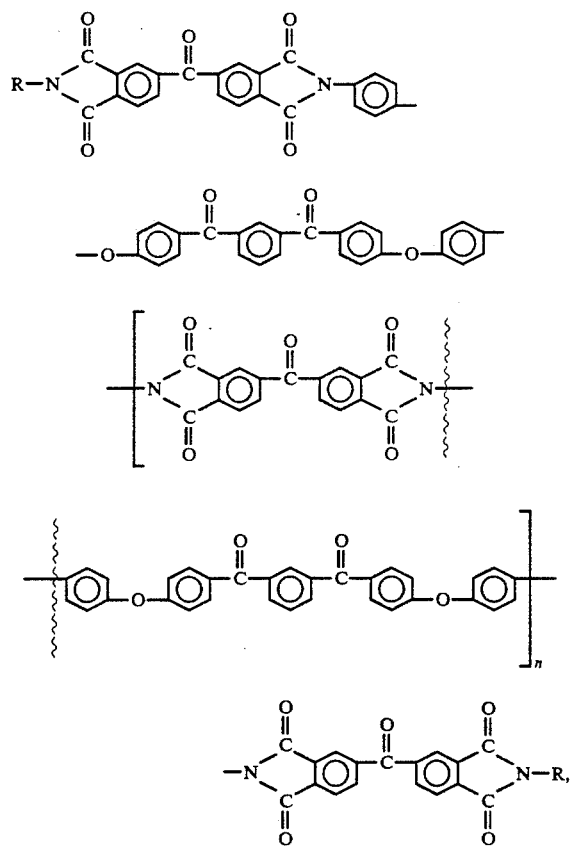

wherein n is a integer between 10 and 200; and

R is selected from the group consisting of:

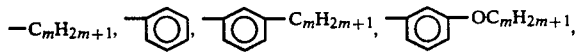
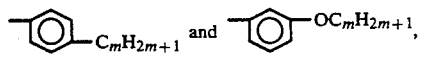

wherein m is an integer between 1 and 10, and wherein the aliphatic groups may be of any structural isomer.

2. The polyamide acid composition having the general structural formula:

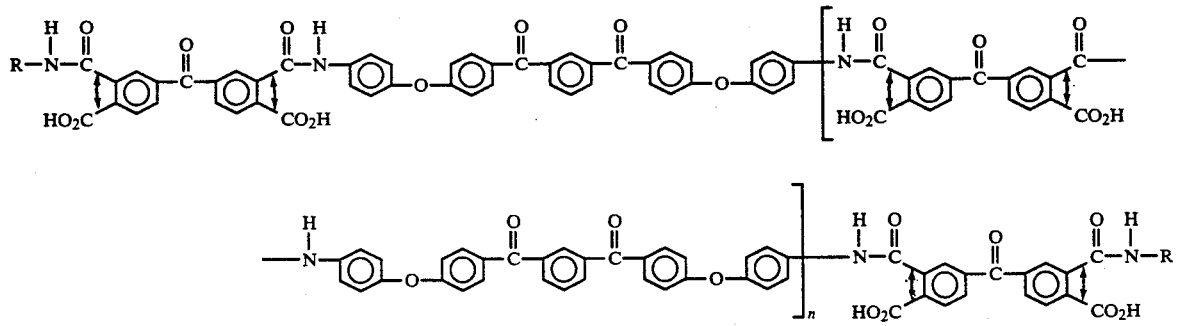

wherein
n is a integer between 10 and 200; and
R is selected from the group consisting of:

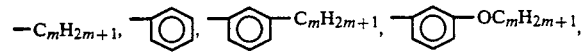
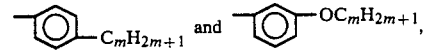

wherein m is an integer between 1 and 10, and wherein the aliphatic groups may be of any structural isomer.

3. The polyimide composition having the general structural formula:

n is a integer between 10 and 200; and
Ar is a divalent aromatic radical selected from:

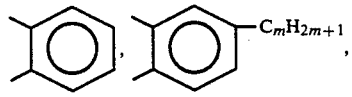

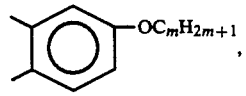

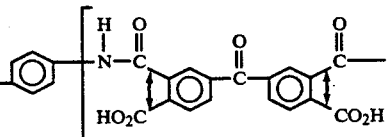

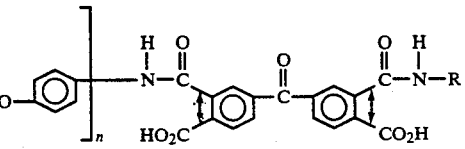

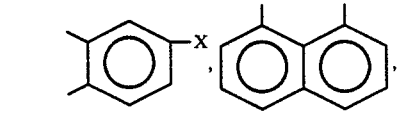

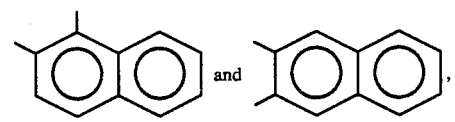

wherein m is an integer between 1 and 10, and wherein X is Br, Cl, $NO_2$, phenyl, phenoxy, benzoyl or phenylsulfonyl.

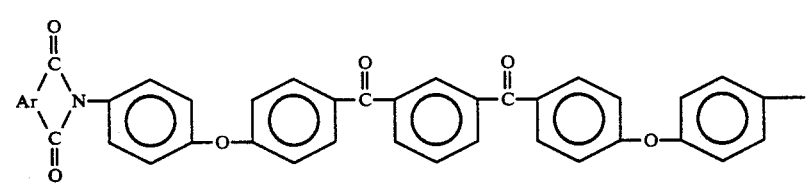

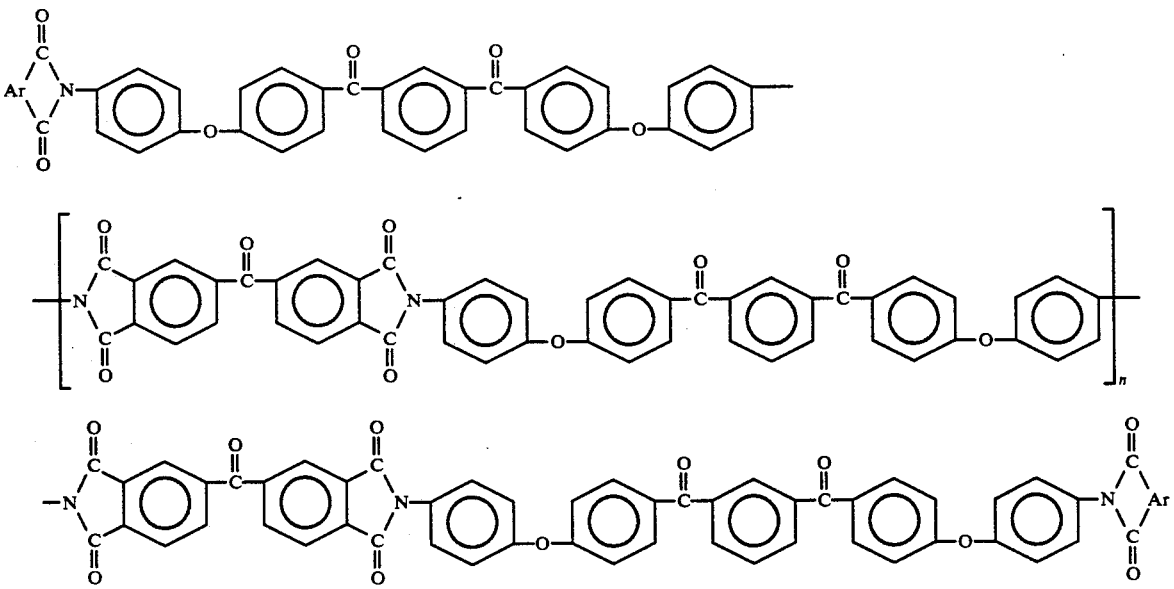

wherein

4. The polyamide acid or polyamide ester composition having the general structural formula:

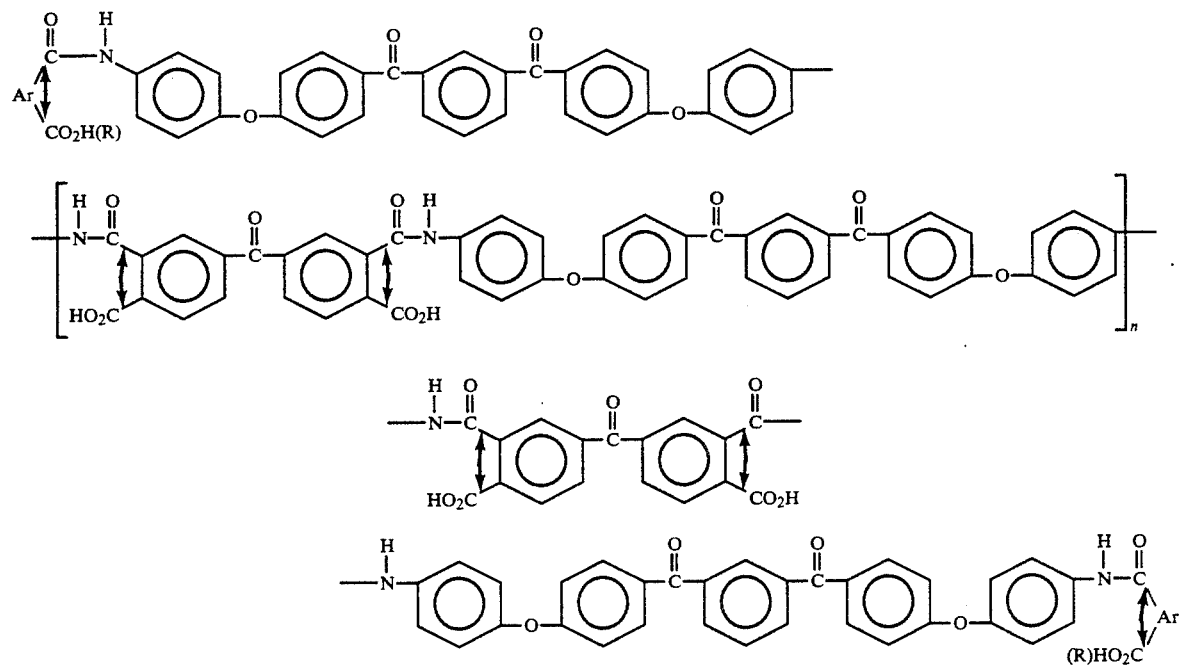

wherein
n is a integer between 10 and 200; and
Ar is a divalent aromatic radical selected from:

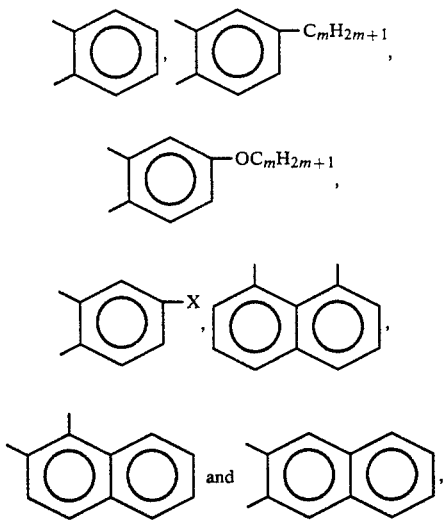

wherein
m is an integer between 1 and 10, and wherein X is Br, Cl, $NO_2$, phenyl, phenoxy, benzoyl or phenylsulfonyl; and wherein
R is selected from the group consisting of:

$-C_mH_{2m+1}$, [phenyl]-$C_mH_{2m+1}$, [phenyl]$C_mH_{2m+1}$,

[phenyl]-$OC_mH_{2m+1}$,

[phenyl]-$C_mH_{2m+1}$ and [phenyl]-$OC_mH_{2m+1}$, wherein m is an integer between 1 and 10, and wherein the aliphatic groups may be of any structural isomer.

5. A composite material comprising a member selected from the group consisting of glass fibers and carbon fibers and the polyimide composition of claim 1.

6. A composite material comprising a member selected from the group consisting of glass fibers and carbon fibers and the polyimide composition of claim 3.

7. A molding material comprising the polyimide composition of claim 1.

8. A molding material comprising the polyimide composition of claim 3.

9. An adhesive composition comprising the polyimide of claim 1.

10. An adhesive composition comprising the polyimide of claim 3.